United States Patent [19]

Jaerger et al.

[11] Patent Number: 5,144,992
[45] Date of Patent: Sep. 8, 1992

[54] INSTALLATION FOR THE TRANSFER BETWEEN RECEPTACLES OF PRODUCTS THAT FLOW UNDER THE EFFECT OF GRAVITY

[75] Inventors: Marc Jaerger, Mareil Marly, France; Willy Lhoest, Brussels, Belgium

[73] Assignees: Gallay S.A., Saint-Denis, France; Lhoest Vereeken Concepts Sprl, Brussels, Belgium

[21] Appl. No.: 571,414

[22] Filed: Aug. 23, 1990

[51] Int. Cl.⁵ .................................................. B65B 1/04
[52] U.S. Cl. .................................. 141/346; 141/93; 141/351; 141/DIG. 1; 141/284
[58] Field of Search ............... 141/85, 89, 93, 284, 141/311 R, 346, 311 A, 347, 348, 349, 350, 351, 352, 353, 354, 357, 358, DIG. 1, 363, 364, 365, 366

[56] References Cited

U.S. PATENT DOCUMENTS

| | | | |
|---|---|---|---|
| 1,770,576 | 7/1930 | Leather | 141/346 X |
| 3,476,507 | 11/1969 | Leeds | 141/348 X |
| 3,707,998 | 1/1973 | Dalrymple | 141/93 |
| 4,054,161 | 10/1977 | Alack | 141/93 X |
| 4,491,161 | 1/1985 | Tamura et al. | 141/364 |
| 4,615,364 | 10/1986 | Kawata | 141/364 |
| 4,751,948 | 6/1988 | Hertig et al. | 141/67 |
| 4,752,807 | 6/1988 | Moret | 141/346 X |
| 4,825,913 | 5/1989 | Stott | 141/93 X |
| 5,018,560 | 5/1991 | Tsukamoto | 141/364 |

FOREIGN PATENT DOCUMENTS

| | | |
|---|---|---|
| 0092008 | 10/1983 | European Pat. Off. . |
| 458573 | 3/1928 | Fed. Rep. of Germany . |
| 2077451 | 10/1971 | France . |

*Primary Examiner*—Ernest G. Cusick
*Attorney, Agent, or Firm*—Shapiro and Shapiro

[57] ABSTRACT

An improved sealing arrangement is provided for a gravity transfer installation of the type in which product is transferred from a container having a sealable opening in its base, downwardly through a chute, and into a receptacle. The arrangement comprises a first plate mounted on guides attached to the chute and for sliding between a position where it covers an upper opening of the chute and a position where it uncovers this opening, and further includes a second plate mounted on guides attached to the container for sliding relative to the latter between a position where it covers a lower opening of the container and a position where it uncovers that opening. The arrangement is constructed such that, in the course of displacement of the container, the movements of the two sliding plates relative to their respective guides are synchronous but in opposite directions.

4 Claims, 8 Drawing Sheets

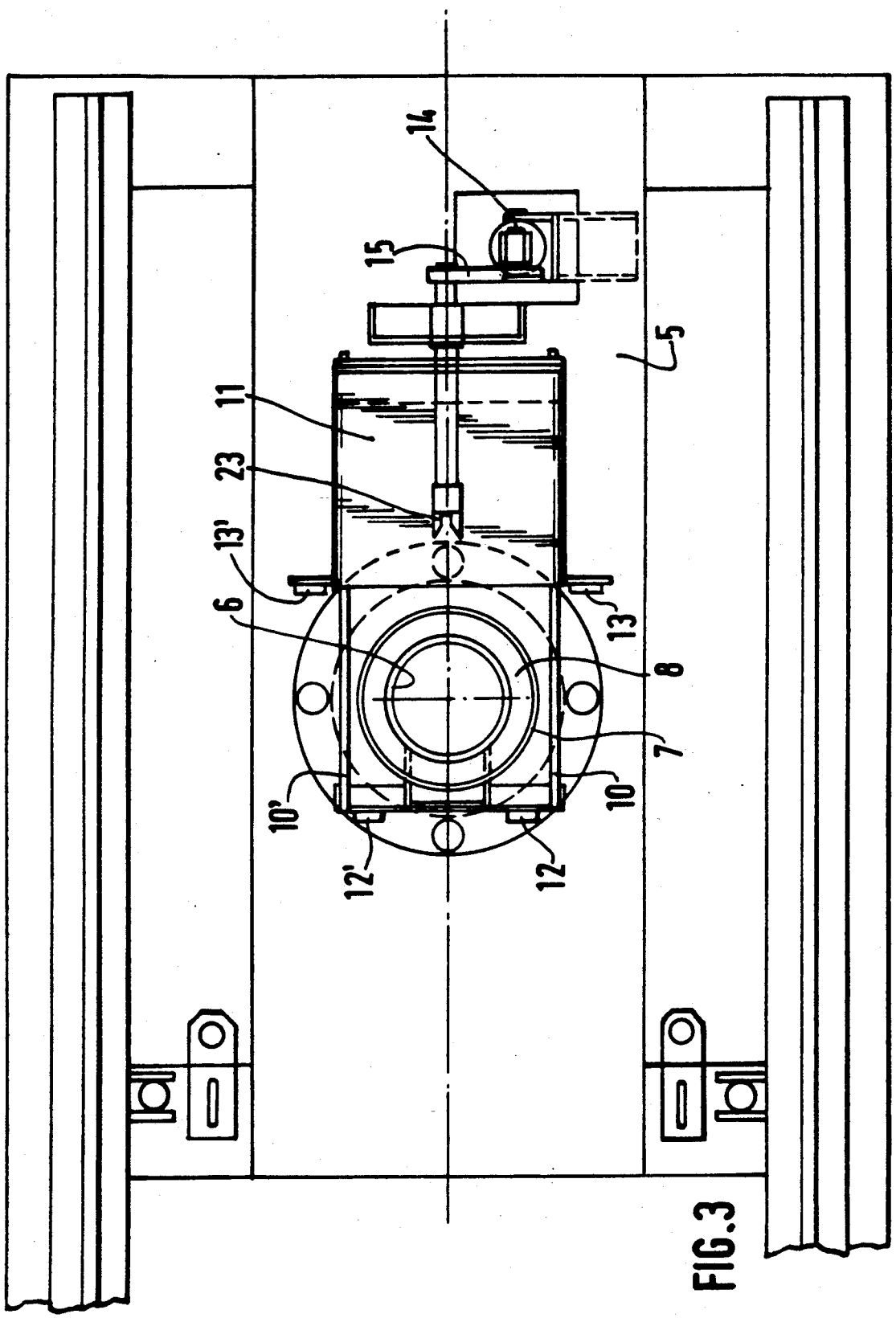

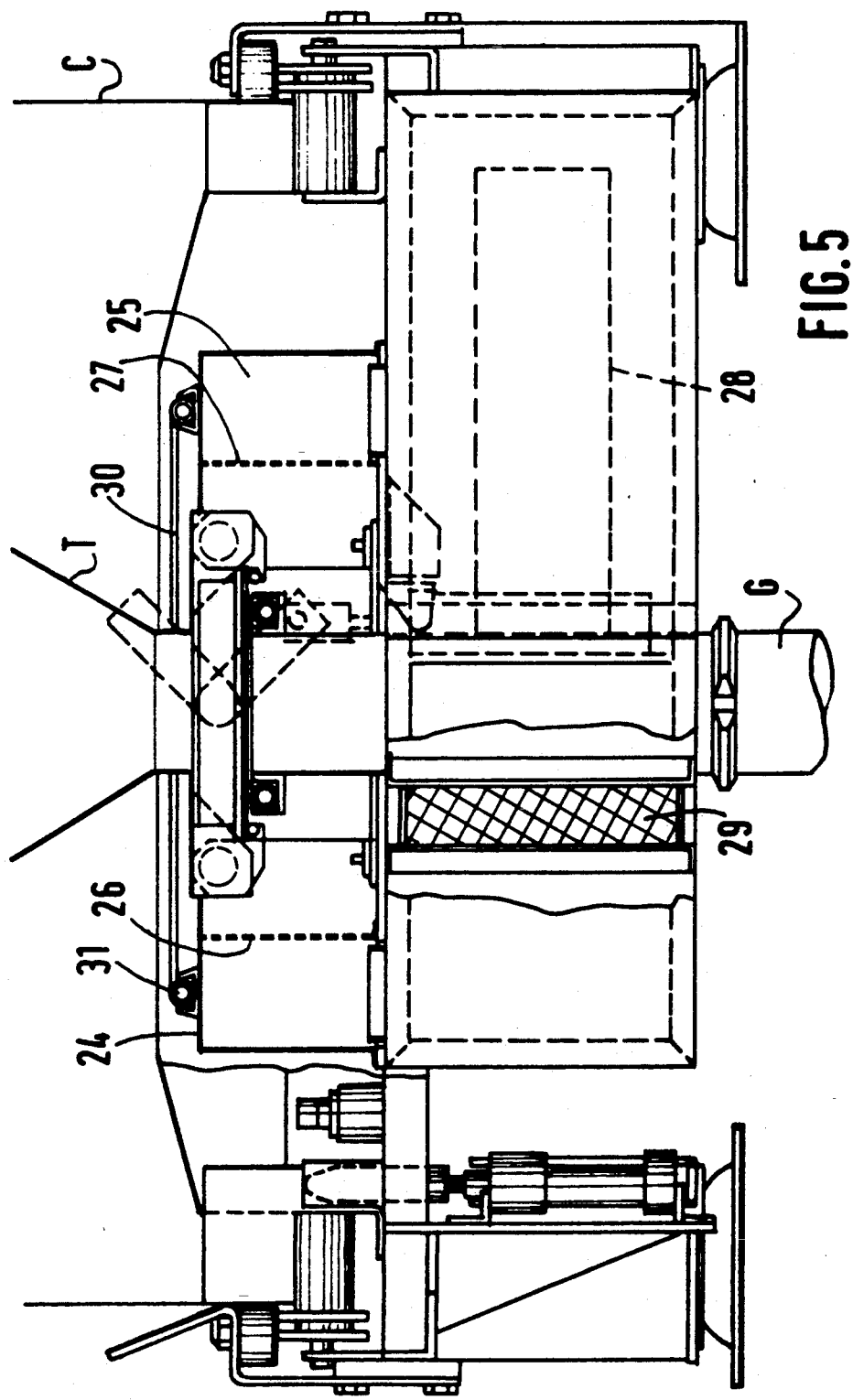

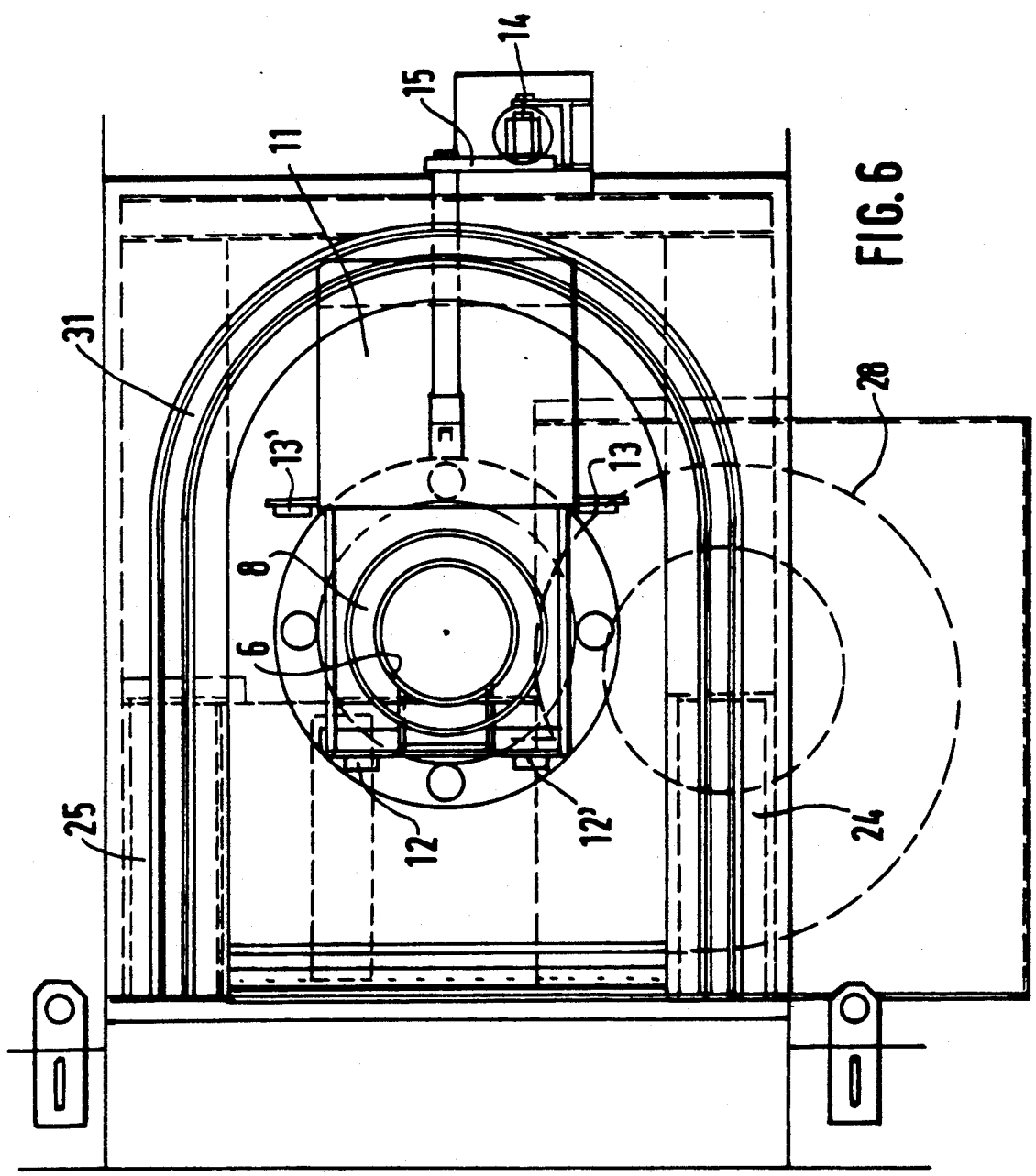

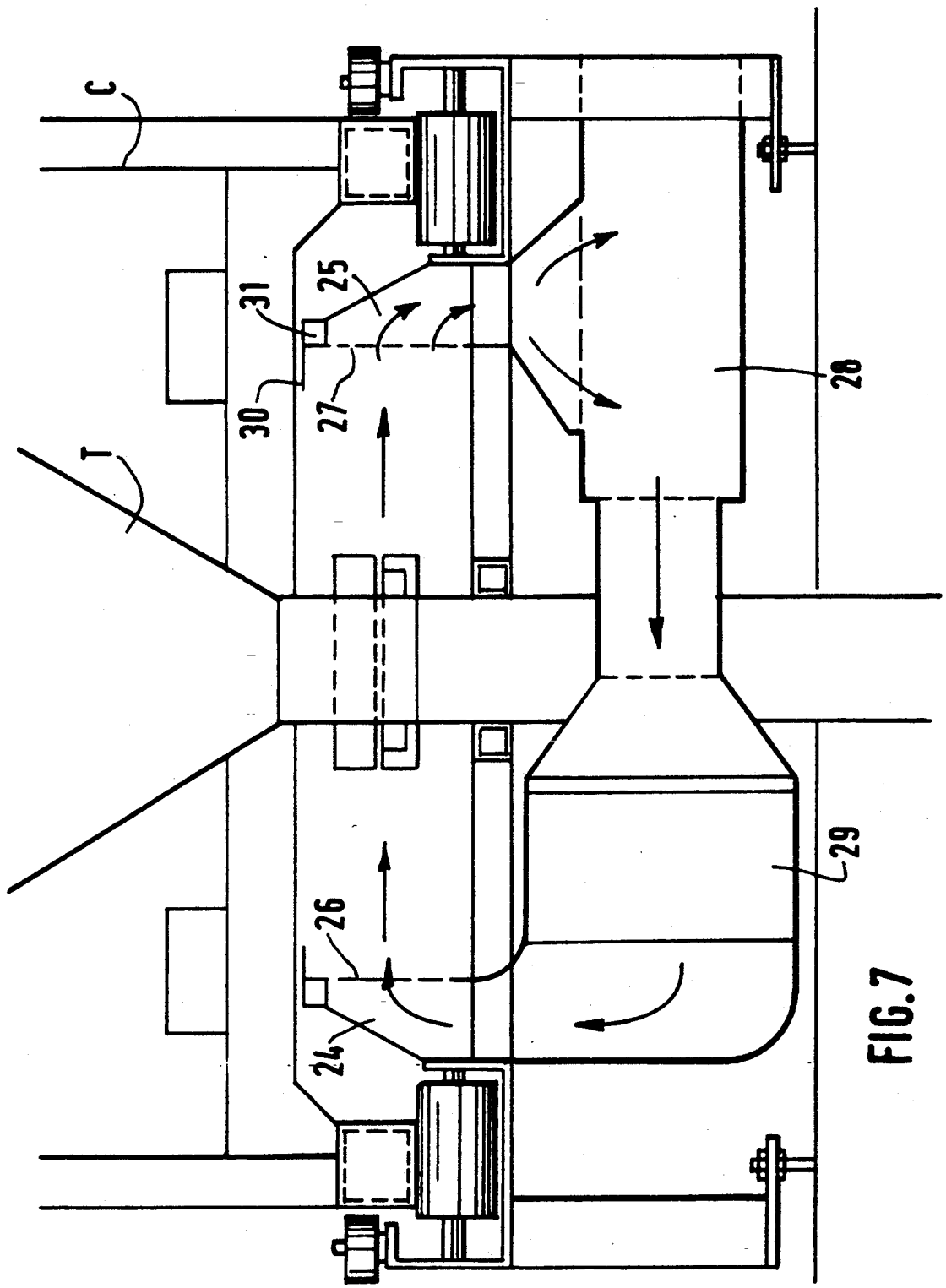

INSTALLATION FOR THE TRANSFER BETWEEN RECEPTACLES OF PRODUCTS THAT FLOW UNDER THE EFFECT OF GRAVITY

BACKGROUND OF THE INVENTION

The present invention relates to installations for transferring liquids. The invention is more particularly concerned with installations of the type for transferring such a product from a receptacle or container having a sealable discharge opening in its base, through a vertical or inclined chute, and into a lower positioned receptacle for the product.

DESCRIPTION OF THE PRIOR ART

In known installations of the foregoing type, a container to be emptied is positioned above the chute in order to effect the transfer of its contents. The container is positioned in such a way that the discharge opening, which is covered by a known type of slide valve, is located directly above an upper opening of the chute exposed to the open air. A simple operation of the slide valve of the container causes the container contents to flow into and through the chute and into the lower receptacle.

In the foregoing process, a significant proportion of particles separated from the products to be transferred escapes into the ambient atmosphere when the container is displaced, as soon as the flow of the products starts and even after the flow of products through the opening of the chute.

The consequences of this pollution can be serious in some cases, especially with installations intended to feed machines for the packaging of toxic products, such as pharmaceutical products.

SUMMARY OF THE INVENTION

The invention is intended to reduce this risk of pollution to a minimum. For this purpose, the invention utilizes a plate mounted on a fixed means of guidance attached to the chute and sliding between a position where it covers the upper opening of the chute and a position where it uncovers this opening, and a second plate mounted on a means of guidance attached to the container to be emptied and sliding relative to the latter between a position where it covers the lower opening of the container and a position where it uncovers said opening. Means are also provided so that, in the course of displacement of the container to and from its emptying position above the opening in the chute and its position of complete disengagement from said chute, the movements of the two sliding plates on their respective guides are synchronous but in opposite directions.

By virtue of this arrangement, during the whole displacement of the container to and from its emptying position above the chute, the lower opening in the container and the upper opening of the chute are never left free to the open air. Each is always closed off from the ambient environment, either completely by its respective plate, or partially by the respective plate and partially by the other plate contacting a flange of the opposite opening.

In conjunction with the above, spread into the atmosphere of the transferred product is further reduced by a joint (for example, an inflatable joint) which is in practice always provided on the flange of the opening in the chute to ensure a tight seal when the two openings are superposed.

In its most advantageous form of, in order to simplify the means to ensure synchronous movement of the two sliding plates, the invention makes provision for these movements to be controlled directly by the movement of the container.

According to a preferred embodiment, provision is made such that, in relation to the travel path of the container, the means of guiding the first plate are arranged in such a way that when the latter is in the covering position, one of the external parts of the container abuts against an end part of said plate and pushes it back to its extreme uncovering position when it reaches its emptying position, with a first permanent magnet ensuring retention of contact between the two parts during the displacement in the opposite direction until the said plate returns to its covering position. In addition the means of guiding the second plate are arranged in such a way that an end part of the latter abuts against an external part of the chute as soon as the container and the first plate come into contact, with a second permanent magnet ensuring retention of two parts until the contact between the container and the first plate are disengaged.

According to a further significant improvement of the invention, a means of creating a laminar air flow subjected to the action of a high-power means of filtering is provided in the zone surrounding the upper part of the chute.

This laminar flow thus ensures the elimination of particles that have escaped the evacuation by the chute.

In still another of its aspects, the invention is intended to improve the efficacy of the joint provided around the upper opening of the chute, and to this end it no longer provides for the use of a single inflatable joint, but a multiple inflatable joint having, for example, two circular concentric joints inflatable independently of one another, and between which openings emerge for the admission of filtered compressed air, or other fluid, and openings for evacuation under vacuum.

This joint structure permits perfect cleaning of the internal space between the openings of the chute and the container.

BRIEF DESCRIPTION OF THE DRAWINGS

Preferred, non-limitative examples of the invention are described hereinafter with reference to the attached drawings in which:

FIG. 3 is a plan view of the installation, in the absence of the container, FIGS. 4a, b, c, d and e are diagrams illustrating the principle of synchronised displacement of the cover plates, FIG. 5 is an end view of the installation of FIGS. 1 to 3, equipped with means of creating a laminar air flow, FIG. 6 is a plan view corresponding to FIG. 5, but in the absence of the container, FIG. 7 is a diagrammatic front view illustrating the circuit of the laminar air flow, FIG. 10 is a cross-sectional view through line X—X.

DESCRIPTION OF THE PREFERRED EMBODIMENT

Figure 1:
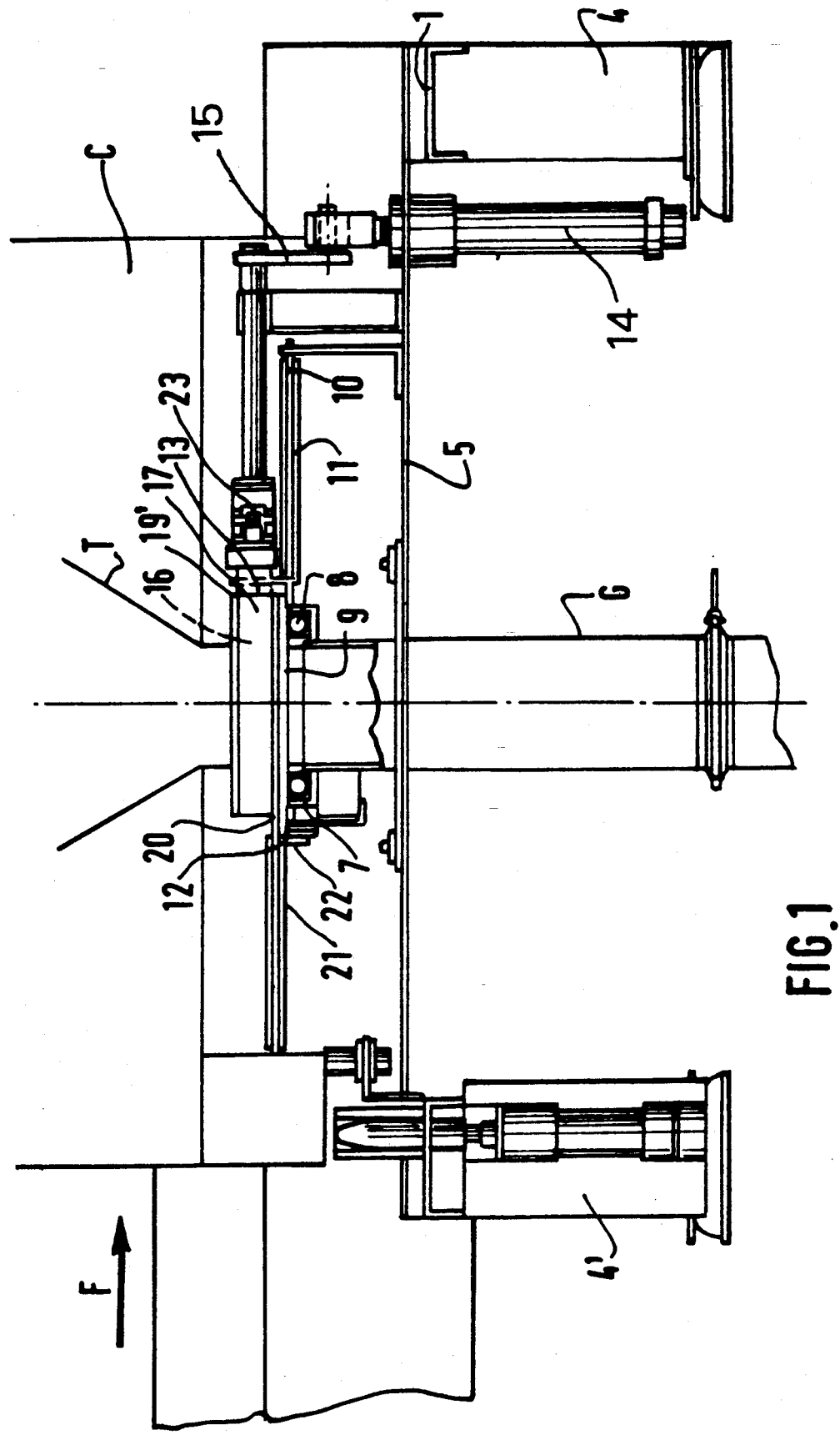
FIG. 1 is a partial view of an installation according to the present invention, in side elevation with a container being in the emptying position, FIG. 2. is an end view of the installation of FIG. 1.
Figure 2:
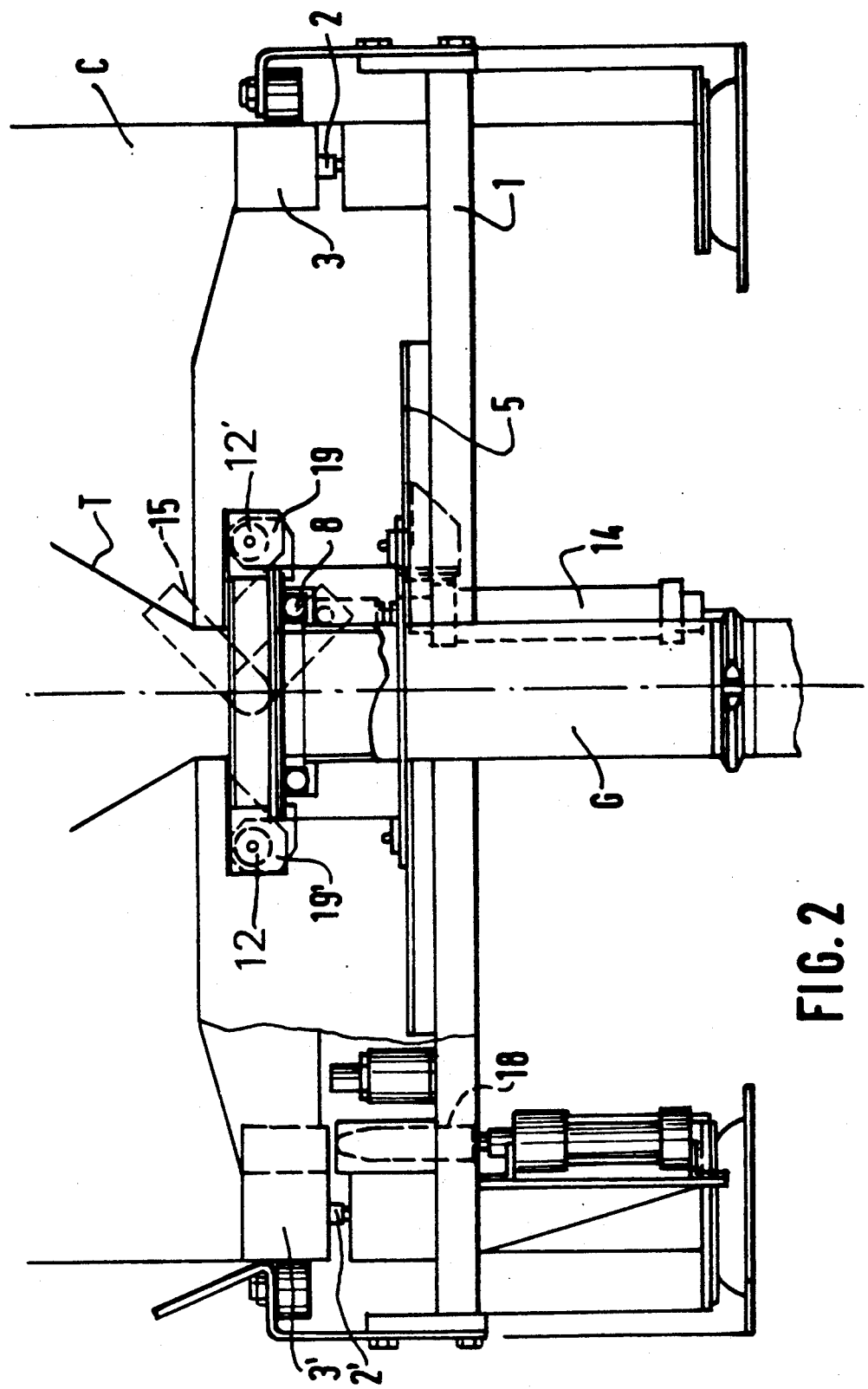

In the example represented in FIGS. 1 to 3, the installation of the invention comprises a support structure, including vertical support members 4, 4' and horizontal beams 1, and two parallel motorized chains 2, 2' on which rest feet 3, 3' of a container C to be emptied (only the lower portion of the container being shown in the drawings).

Vertical member 4, 4' of the supporting structure support a plate 5 of width less than the distance between the chains 2, 2' and provided with an opening 6 through which a transfer chute G passes, having its axis equidistant from the two chains 2, 2' and its upper end projecting above plate 5.

The plate 5 serves to support, on the one hand, a flange 7 for accomodating an inflatable joint 8 mounted on the upper part 9 of the chute G and, on the other hand, two horizontal parallel rods 10, 10' equidistant from a radial plane of the chute, and on which an essentially square metal plate 11 is mounted in a sliding fashion. Two permanent magnets 12, 12' are attached to the end of the rods 10, 10' and two permanent magnets 13, 13' are mounted to the sides of plate 11 at one end thereof.

The plate 5 also serves to support a screw jack 14 and a driving crank 15 for controlling a slide valve 16 of a funnel T of container C, accommodated in a housing 17.

For the emptying operation, the container C with its feet 3, 3' resting on the chains 2, 2' at the start of a feed track is drawn by these chains in the direction of arrow F (FIG. 1), which we shall define as moving forward. The container moves forward until the housing 17 of its slide valve 16 is above the openings of the chute and the inflatable joint 8, in the emptying position. Here, it is blocked by a mechanical stop 18. At the front of the housing 17, two metal plates 19, 19' are then in contact with the two magnets 13, 13' of the plate 11.

Two horizontal parallel rods 20 are attached to the container beneath the housing 17, serving as guides for a plate or dummy cover 21 having a shape similar to that of plate 11 and to that of the lower face of housing 17. This plate 21 is mounted slidingly on the rods 20. On its forward end it has a downward shoulder 22 which, in the emptying position (FIG. 1), is in contact with the magnets 12, 12'.

The end 23 of driving crank 15 then engages the end of the shaft of slide valve 16.

The operation of the installation that has just been described can easily be explained by reference to the diagrammatic FIGS. 4a, b, c, d, e and f.

Figure 4A:
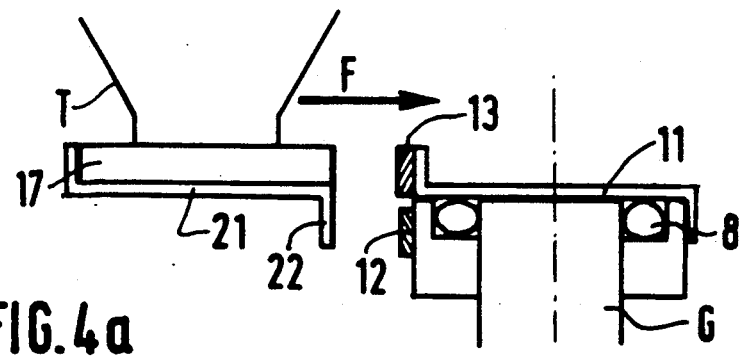

FIG. 4a represents the initial situation in which the plate 11, with its magnet 13, covers the chute G, and the funnel T is moving towards the chute, the funnel carrying beneath it plate 21 covering its lower opening.

Figure 4B:
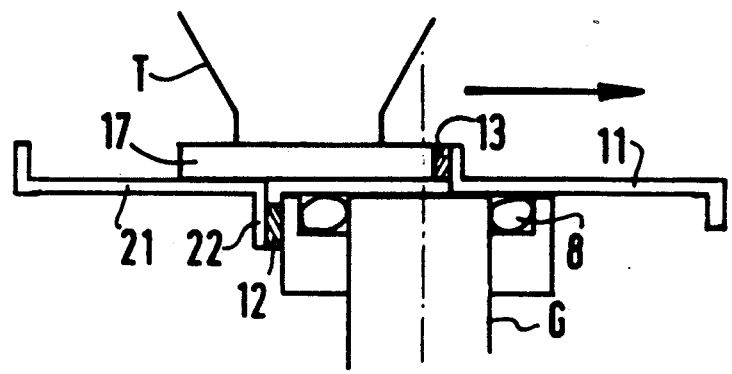

The FIG. 4b the container its movement, but plate 21 stops with its shoulder 22 abutting against the magnet 12. At the same time, the plate 11 is pushed by the housing 17.

Figure 4C:
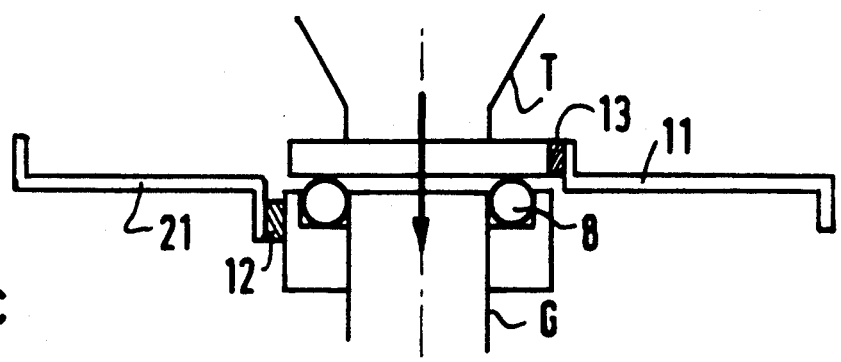

In FIG. 4c the container has arrived at the emptying position, its funnel T being above the chute and in contact with the magnet 13 of plate 11, completely pushed back by the housing 17.

Figure 4D:
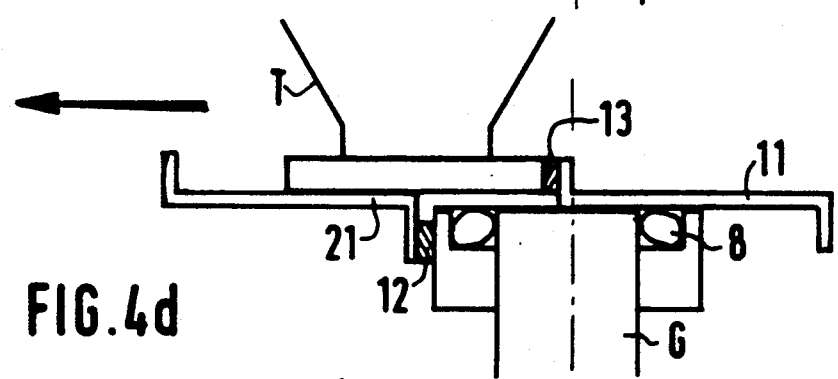

The FIG. 4d, after emptying, the container returns, drawing plate 11 with it, while plate 21 continues to be retained by magnet 12.

Figure 4E:
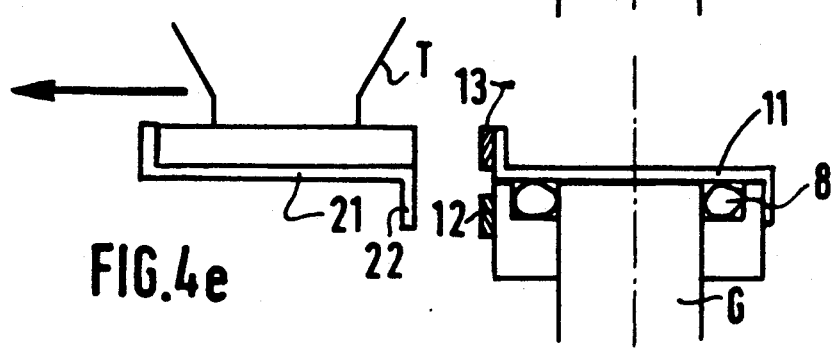

The FIG. 4e the container is continuing to move back, but now drawing under its funnel T the plate 21 which it has detached from magnet 12. Since the plate 11 has in the meantime been brought to a stop, the magnet 13 is detached from the container.

FIG. 4c corresponds to the situation illustrated in FIG. 1, the joint 8 being inflated, i.e. in the container's emptying position after opening of the slide valve 16 by the screw jack 14.

Once the funnel T is empty, the joint 8 is deflated, the slide valve is closed again and the chains 2, 2' are put into operation to draw the container backwards, in the direction opposite to arrow F, i.e. towards the start of the feed track.

FIG. 4d corresponds to an intermediate position of the container during its displacement backwards. By virtue of the magnets 13, 13' contacting the metal plates 19 of the housing 17, the dummy cover 11 is drawn backwards by sliding on the rods 10, 10'. The cover 21 is held in place by the contact between its shoulder 22 and the magnets 12, 12', and the guide rods 20 slide on it.

FIG. 4e corresponds to the position of the container in which the cover 11 has come to a stop at the rear end of its guide rods 10, 10'.

The funnel T is then above the cover 21. The continuation of the displacement of the container backwards has caused the separation, on the one hand, of the plates 10 and the magnets 13, 13' and, on the other hand, the separation of the shoulder 22 and magnets 12, 12'. The container draws its cover 21 along with it.

It can be seen that, during the displacement after emptying, the upper opening of the chute and the lower opening of the container are never left freely exposed to the open air, because their covers and the respective flanges surrounding these openings are maintained in contact.

The risks of atmospheric pollution are reduced to a very considerable extent.

In the example represented in FIGS. 5 to 7, provision is made to reduce these risks still further by passing a laminar air flow around the upper part of the chute. For this purpose, two air-tight chambers 24, 25 are mounted opposite one another on each side of the chute, and respective parallel walls 26, 27 thereof facing opposite one another are perforated. Chamber 24 is connected up to the delivery from a fan 28 by a pipe on which a high-power filter 29 is fitted.

The air circulates from chamber 24 to chamber 25 in the direction of the arrows (FIG. 7) and arrives back at the fan 28.

A cover plate 30 and a joint 31 are provided at the upper part of the chambers 24, 25.

Figure 8:
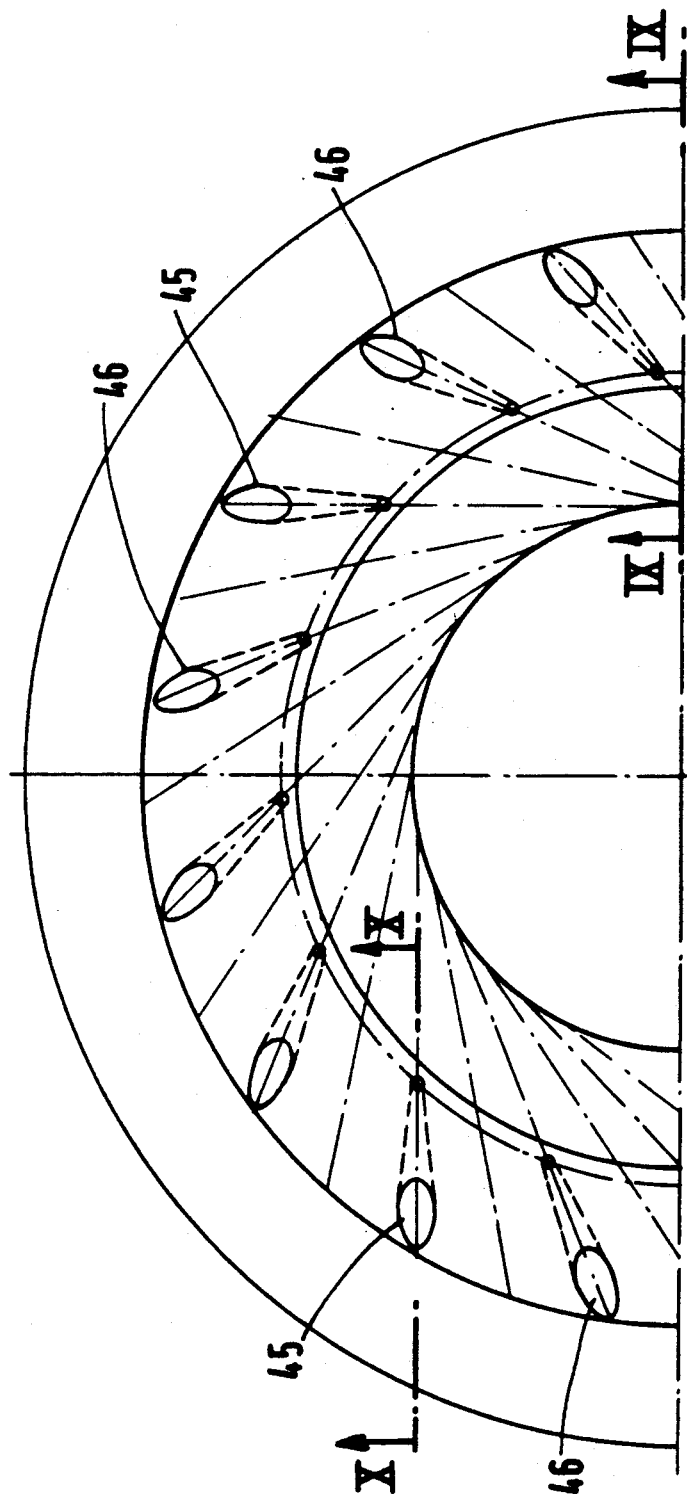
FIGS. 8 to 10 illustrate a particular advantageous form of the chute joint, FIG. 9 being a cross-sectional view through line IX—IX
Figure 9:
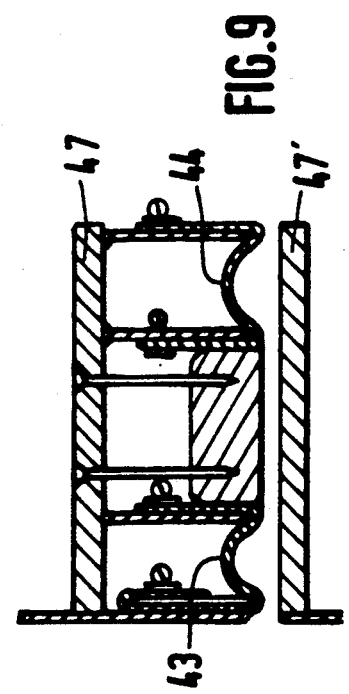
Figure 10:

In the example represented in FIGS. 8 to 10, an improved joint according to the invention is shown which is particularly adapted to perfect cleaning between the chute and the container. The improved joint, which is used in place of the single inflatable joint 8 of FIGS. 1–3, comprises two coaxial inflatable joints 43, 44, compressed air or other gas ducts 45, and ducts 46 connected to a vacuum source (not shown). The ducts 45 and 46 open between the inflatable joints in the space between the flanges 47, 47'.

When closing, the external joint 44 is inflated, compressed air is passed through the ducts 45 and a vacuum is applied through ducts 46. Then the inner joint 43 is inflated, thus ensuring a clean well-sealed joint.

When opening, the internal joint 43 is allowed to deflate, compressed air is applied to clean the internal space, then the external joint 44 is allowed to deflate.

We claim:

1. Installation for transferring product that flows under the effect of gravity, such as powders, granulates or liquids, comprising:

a container in which the product is received and having a base with a sealable discharge opening; receptacle means positioned lower than said container for receiving the product; fixed chute means having an upper opening for receiving the product from said discharge opening, and connected to said receptacle means for transferring the product downwardly to said receptacle means; said container being displaceable to and from a product emptying position above said upper opening of said chute means;

a first plate; fixed first guide means attached to said chute means and supporting said first plate for sliding movement between a first covering position where said first plate covers said upper opening of said chute means and a first uncovering position where said first plate uncovers said upper opening; second guide means; a second plate slidably mounted to said second guide means for sliding movement between a second covering position where said second plate covers said discharge opening of said container and a second uncovering position where said second plate uncovers said discharge opening; and means effective during displacement of said container to and from said product emptying position for causing said first and second plates to slide in synchronism but in opposite directions relative to their respective guide means; and wherein said first guide means is arranged such that when said first plate is in said first covering position and said container moves to said product emptying position, an external part of said container abuts against an end part of said first plate and pushes said first plate back to said first uncovering position when said container reaches said emptying position; first permanent magnet means is provided for maintaining contact between said abutting parts of said first place and said container during movement of said container in an opposite direction until said first plate returns to said first covering position; said second guide means is arranged such that an end part of said second plate abuts against an external part of said chute means as soon as said container and said first plate come into contact; and second permanent magnet means is provided for maintaining contact between the abutted parts of said second plate and said chute means until said container and said first plate disengage.

2. Installation according to claim 1, in which means are provided for controlling the sliding of said first and second plates in synchronism directly by the movement of said container.

3. Installation according to claim 1, including means defining a zone surrounding an upper part of said chute means, means for creating a laminar air flow at said zone, and high power filtering means for treating said air flow.

4. Installation for transferring product that flows under the effect of gravity, such as powder, granulates or liquids, comprising:

a container in which the product is received and having a base with a sealable discharge opening; receptacle means positioned lower than said container for receiving the product; fixed chute means having an upper opening for receiving the product from said discharge opening, and connected to said receptacle means for transferring the product downwardly to said receptacle means; said container being displaceable to and from a product emptying position above said upper opening of said chute means;

a first plate; fixed first guide means attached to said chute means and supporting said first plate for sliding movement between a first covering position where said first plate covers said upper opening of said chute means and a first uncovering position where said first plate uncovers said upper opening; second guide means; a second plate slidably mounted to said second guide means for sliding movement between a second covering position where said second plate covers said discharge opening of said container and a second uncovering position where said second plate uncovers said discharge opening; and means effective during displacement of said container to and from said product emptying position for causing said first and second plates to slide in synchronism but in opposite directions relative to their respective guide means; and in which there is provided around said upper opening of said chute means a double joint comprising two circular concentric joints inflatable independently of one another, between which joints emerge openings for the admission of filtered compressed fluid, and/or openings for evacuation under vacuum.

* * * * *

UNITED STATES PATENT AND TRADEMARK OFFICE
CERTIFICATE OF CORRECTION

PATENT NO. : 5,144,992
DATED : September 8, 1992
INVENTOR(S) : Marc JAEGER et al It is certified that error appears in the above-identified patent and that said Letters Patent is hereby corrected as shown below:

On the cover sheet:

In item [19]:
"Jaerger et al" should read --Jaeger et al--;

In item [75]:
"Marc Jaerger" should read --Marc Jaeger--.

Column 1:
sixth line, before "liquids" insert --products that flow under the effect of gravity, such as powders, granulates or--.

Signed and Sealed this

Third Day of May, 1994

Attest:

BRUCE LEHMAN

Attesting Officer

Commissioner of Patents and Trademarks